Figure 2:
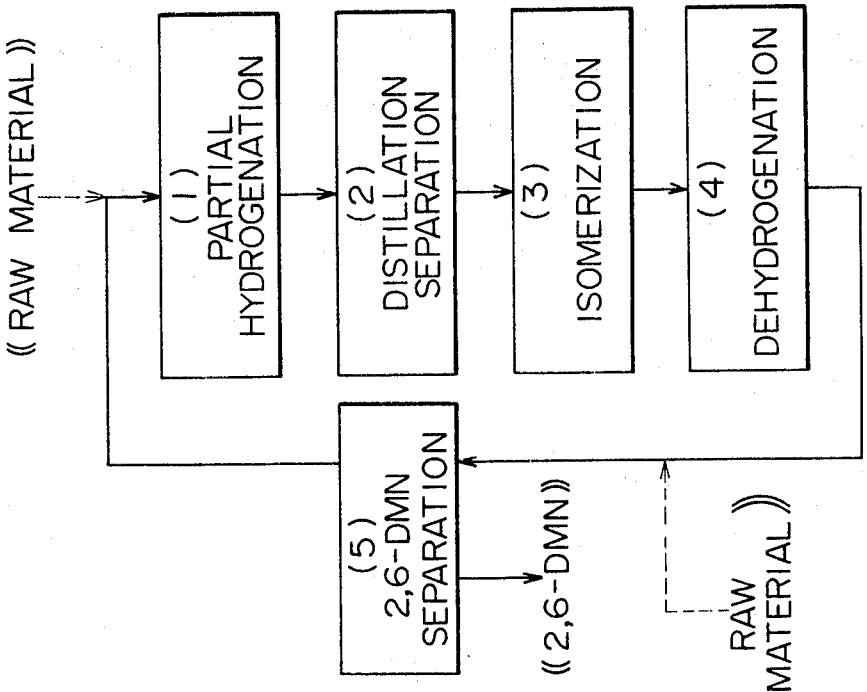

United States Patent

Shimada et al.

[11] 3,890,403
[45] June 17, 1975

[54] PROCESS FOR SEPARATING AND RECOVERING 2,6-DIMETHYLNATHTHALENES

[75] Inventors: Keizo Shimada; Takeo Nishikawa; Toshiaki Harada; Shizuo Nagahama, all of Tokyo, Japan

[73] Assignee: Teijin Limited, Osaka, Japan

[22] Filed: Nov. 14, 1973

[21] Appl. No.: 415,646

[52] U.S. Cl...... 260/674 N; 260/668 A; 260/668 D; 260/668 F; 260/674 N
[51] Int. Cl............................................. C07c 7/02
[58] Field of Search........ 260/668 A, 668 D, 668 F, 260/674 N

[56] References Cited
UNITED STATES PATENTS

| | | | |
|---|---|---|---|
| 3,428,698 | 2/1969 | Peterson | 260/668 |
| 3,594,436 | 7/1971 | Hedge et al. | 260/674 |
| 3,725,490 | 4/1973 | Nagahama et al. | 260/674 |

Primary Examiner—Delbert E. Gantz
Assistant Examiner—C. E. Spresser
Attorney, Agent, or Firm—Sherman and Shalloway

[57] ABSTRACT

A process for separating and recovering 2,6-dimethylnaphthalene from a dimethylnaphthalene mixture containing

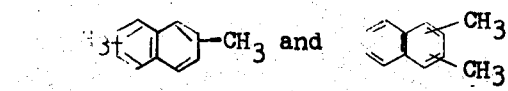

which comprises the steps of:
i. partially hydrogenating the above dimethylnaphthalene mixture to a dimethyltetralin mixture,
ii. prior to or after isomerization of the said dimethyltetralin mixture separating the partially hydrogenated dimethyltetralins (I) of said

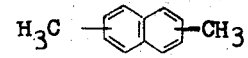

from partially hydrogenated dimethyltetralins (II) of said

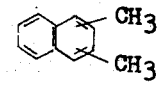

and collecting dimethyltetralins (I),
iii. dehydrogenating said dimethyltetralins (I) to be

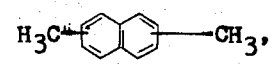

and
iv. separating and recovering 2,6-dimethylnaphthalene from the resultant dehydrogenation product and recycling the residual dimethylnaphthalenes to the above partial hydrogenation step (i).

8 Claims, 2 Drawing Figures

PROCESS FOR SEPARATING AND RECOVERING 2,6-DIMETHYLNAPHTHALENES

This invention relates to an improved process in which 2,6-dimethyl naphthalene can be separated and recovered from a dimethylnaphthalene mixture containing

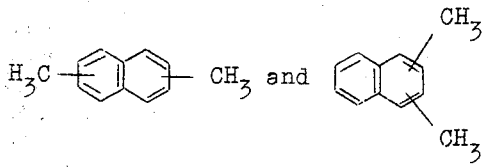

in markedly high yields and by virtue of a very easy separating operation.

There are known ten isomers for dimethylnaphthalene (occasionally simply termed "DMN"), and these isomers can be classified into the following two types:

Type I and Type II

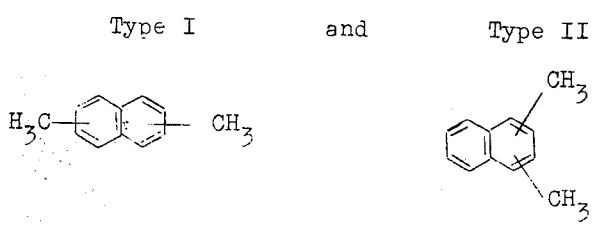

Shown in Table 1 are concrete examples of these isomers of types I and II as well as their boiling points, as mentioned in Beilstein Handbuch

TABLE 1

| Type I | Type II |
|---|---|
| 2,6-DMN 262°C | 1,2-DMN 266°C |
| 2,7-DMN 263 | 1,3-DMN 263 |
| 1,8-DMN 270 | 1,4-DMN 268 |
| 1,7-DMN 263 | 2,3-DMN 265 |
| 1,6-DMN 263 | |
| 1,5-DMN 265 | |

These DMNs are known to become isomerized in accordance with the shift series expressed by the following formulae (1) to (3):

$$2,6\text{-DMN} \rightleftarrows 1,6\text{-DMN} \rightleftarrows 1,5\text{-DMN} \quad (1)$$
$$2,7\text{-DMN} \rightleftarrows 1,7\text{-DMN} \rightleftarrows 1,8\text{-DMN} \quad (2)$$
$$2,3\text{-DMN} \rightleftarrows 1,3\text{-DMN} \rightleftarrows 1,4\text{-DMN} \quad (3)$$

It is also known that the 1,2-DMN will not be isomerized to other DMN isomers.

The usually available DMN is a mixture of isomers of the above types I and II, for example, as prepared in the petrochemical industry. Of these isomers the 2,6-DMN can be easily converted to naphthalene-2,6-dicarboxylic acid through oxidation. The resulting dicarboxylic acid is a raw material for use in the production of polyesters useful in the field of synthetic fibers, films, etc. Accordingly, the 2,6-DMN is commercially very useful.

As shown in Table 1, however, it is extremely difficult to separate type I isomers to which 2,6-DMN belongs from type II isomers efficiently and by virtue of a simple procedure because the former and latter isomers are very close to each other in boiling point.

Further, for example, the amount of the 2,6-DMN contained in DMN mixtures prepared in the petrochemical industry is at most about 15% by weight, and for obtaining 2,6-DMN in larger amounts it is ordinary to subject said DMN mixture to an isomerization reaction.

As shown in the shift series of the formulae (1) to (3), however, since only 1,5-DMN and 1,6-DMN are isomerized to the 2,6-DMN, the 2,6-DMN can be prepared from the starting DMN mixture in an amount of about 25% by weight at most even by separating the 2,6-DMN from the isomerization reaction product and recycling the residue to the isomerization reaction system. Moreover, when the reaction is continued with recycling, the 1,2-DMN, 2,7-DMN shift system isomers and 2,3-DMN shift system isomers deposit within the reaction system and impede a smooth progress of the isomerization reaction. It is also hard to separate 1,6-DMN and 1,5-DMN from these undesirable isomers deposited. For this reason, it is practically impossible to carry out the above reaction accompanied by the recycling of the residue.

After strenuous studies made to overcome these difficulties, the inventors became aware of the fact that the 2,6-DMN can be prepared in high yields of more than the double, frequently more than about 60% by weight of the starting DMN mixture, as compared with the prior art process accompanying the said difficulty and type I DMN can be easily separated from type II DMN only through the distillation means by subjecting the DMN mixture to an isomerization reaction after the DMN mixture is partially hydrogenated to form a dimethyltetralin (occasionally simply termed "DMT") mixture, separating the partially hydrogenated dimethyltetralins (I) of type I

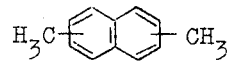

from the partially hydrogenated dimethyltetralins (II) of type II

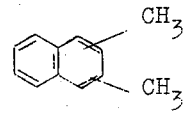

in the DMN mixture and dehydrogenating the resulting dimethyltetralins (I) to the original type I DMN of the formula

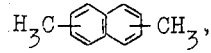

prior to or after said isomerization, and further by recycling for re-use the residual DMN mixture of the 2,6-DMN being separated and recovered from the type I DMN to the above partial hydrogenation step.

Accordingly, it is an object of the present invention to provide an improved process wherein 2,6-DMN can be separated and recovered from a DMN mixture in markedly high yields and by virtue of a very simple separating procedure.

Still other objects and advantages of the invention will be more apparent from the following description.

According to the process of the invention, there is provided a process for separating and recovering 2,6-DMN from a DMN mixture which contains

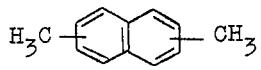

and 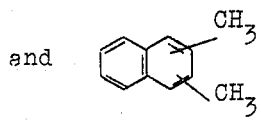

which comprises the steps of:
i. partially hydrogenating the above DMN mixture to form a DMT mixture;
ii. separating the partially hydrogenated dimethyltetralins (I) of said

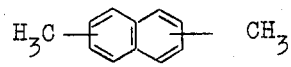

from the partially hydrogenated dimethyltetralins (II) of said

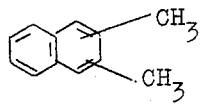

before or after isomerizing said DMT mixture, and collecting DMT (I);
iii. dehydrogenating said DMT (I) to form

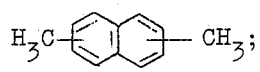

and
iv. separating and recovering 2,6-DMN from the resultant dehydrogenation product and recycling the residual type I DMN to the above partial hydrogenation step.

In the process of the invention wherein the above DMN mixture is partially hydrogenated to form a DMT mixture and the DMT mixture so obtained is isomerized, there is absolutely no need for separating and removing type II DMN having exerted bad effects on the isomerization reaction of DMN mixtures, but the above reaction can be effected without causing any adverse effect. Further, even the presence of alkylbenzenes in the DMN mixture presents no difficulty. In addition, since the DMN mixture is converted to the DMT mixture and then isomerized, the result is that not only isomers of the above shift series (1) but isomers of the shift series (2) can be shifted to isomers of the series (1).

Consequently, according to the process of the invention the 2,6-DMN can be prepared in high yields by using as the starting mixture any DMN mixture which contains at least one DMN isomer selected from the group consisting of 1,6-DMN, 1,5-DMN, 2,7-DMN, 1,7-DMN and 1,8-DMN. As is well known, the starting DMN mixture may be obtained from oil formed in the dry distillation of coals and oil resulting from the catalytic reforming of heavy naphtha or from catalytic cracking of heavy oil. When aromatics are extracted from the oil derived from a petroleum-type material and distilled, an aromatic hydrocarbon mixture as a fraction boiling at 260° – 270°C. mainly comprises the DMN mixture and includes about 10 – 40% alkyl benzenes as other ingredients. It is very hard to distill and separate the DMN containing-aromatic hydrocarbon mixture so obtained into dimethylnaphthalenes and alkyl benzenes because of nearly the same boiling points. In the process of the invention, as described above, such a dimethylnaphthalene mixture containing alkylbenzenes can be directly employed as the raw material.

In the process of the invention, the first step is to partially hydrogenate the DMN-containing-aromatic hydrocarbon mixture or a DMN mixture which contains

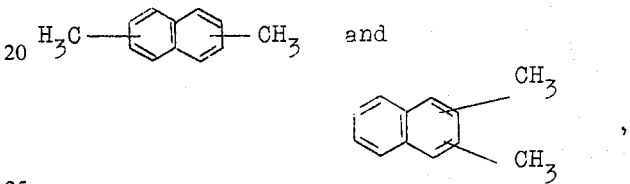

such as the residue resulting from the separation of the 2,6-DMN from the hydrocarbon mixture. A far greater difference is recognized in boiling point between DMT (I) resulting from the partial hydrogenation of type I DMN and DMT (II) from the partial hydrogenation of type II DMN than that between type I DMN and type II DMN. Namely, DMT (I) boils at approximately 230° – 240°C., while DMT (II) does at approximately 252° – 254°C.

Because of a difference of about more than 12°C. in boiling point separation of the two is rendered possible without difficulty by virture of a simple distillation operation. Further, as alkylbenzenes capable of being mixed in starting DMN mixture are not hydrogenated, they display no change in boiling point, and it is also easy to separate the mixture into DMT (I) and DMT (II).

It is preferred here that the partial hydrogenation be conducted to the extent that only one of the nuclei in

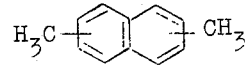

will be hydrogenated and only the nucleus not substituted by the group — $CH_3$— in

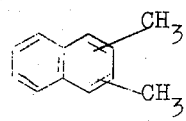

be hydrogenated. The partial hydrogenation can be conducted with the use of a known hydrogenation catalyst. Specific examples of such catalysts include nickel (Raney nickel, stabilized nickel, etc.), platinum, palladium, rhodium, copper-chromium, iridium or ruthenium. It is desirable to use a nickel, palladium or copper-chromium catalyst for the purpose of inhibiting the formation of dimethyldecalins and increasing the yields of DMTs. The partial hydrogenation reaction may be carried out either batchwise or by a continuous flow system.

Conditions for the partial hydrogenation reaction are properly varied depending on the catalyst used, and they may be generally chosen within the range in which the temperature is 100° to 300°C. and hydrogen pressure is 1 to 250 kg/cm$^2$. The preferred conditions slightly vary according to the kind of catalyst. For instance, in the case of using a nickel catalyst the initial hydrogen pressure shall be ranging from 5 to 50 kg/cm$^2$ at the reaction temperature of 150°C., and the DMT may be prepared in a yield of 99% by using hydrogen in amounts stoichiometrically required for the conversion of DMN to DMT. Moreover, DMT may be prepared in yields higher than 98% by setting the reaction temperature at 200°C., using hydrogen in the above amounts and at a reaction pressure of 2 to 10 kg/cm$^2$. In this case, it is made easy to form dimethyldecalins by adjusting the reaction pressure to at least 30 kg/cm$^2$. Further, it is preferred that the partial hydrogenation reaction be effected at 200° – 250°C. and at a pressure of 20 – 200 kg/cm$^2$ in the event of employing a copper-chromium catalyst. This catalyst has weak activity but is superior in selectivity. Accordingly, almost no formation of dimethyldecalins is recognized.

In the process of the invention the isomerization of the DMT mixture so obtained follows or precedes the separation and recovery of DMT (I). Further, prior to the isomerization the catalyst used in the partial hydrogenation reaction is separated and removed.

The isomerization reaction of said DMT mixture or DMT (I) separated can be effected in the presence of a solid acid catalyst at 150° – 450°C. and preferably at 200° – 400°C. It is appropriate that the catalytic reaction time ranges from 0.1 to 10 V/V/hr and preferably 0.2 to 3 V/V/hr as the liquid hourly space velocity. The isomerization reaction can be conducted under atmospheric, reduced or elevated pressure. In the reaction there can be employed a carrier gas, for example, inert gases such as hydrogen or nitrogen; or lower hydrocarbons such as methane, ethane, or propane; aromatic hydrocarbons such as benzene, toluene, xylene; or their mixtures. Examples of the solid acid catalyst which is used in the isomerization reaction include zeolite type catalysts such as silica-alumina, silica-magnesia, alumina-boria, Y-type zeolite or mordenite catalyst. These catalysts can be subjected to calcination prior to use or used on a proper carrier.

The isomerization reaction is a process in which the concentration each of 2,6-isomer, 1,6-isomer, 1,5-isomer, 2,7-isomer, 1,7-isomer and 1,8-isomer within the system is brought near to the thermodynamical equilibrium concentration at the reaction temperature. Accordingly, it is possible to convert substantially all of these isomers into 2,6-DMNs by a procedure comprising dehydrogenating DMT (I) to DMN again, extracting the 2,6-DMN therefrom and recycling the residue. In consideration of the above, it is more preferable that when the 2,6-isomer is already contained in the starting DMN, 2,6-DMN can be produced in larger amounts by isomerization when the residual DMN mixture resulting from the separation of as much 2,6-isomer as possible is employed as the starting material.

According to the process of the invention, the DMT (I) can be separated easily from DMT (II) to recover DMT (I) by virtue of a conventional distillation means. The distillation may be conducted under atmospheric pressure or reduced pressure. In accordance with the distillation at atmospheric pressure there can be prepared as a fraction boiling at 230° – 240°C. DMT (from which 2,6-DMN can be prepared by the process of the invention) in which one methyl group is linked to each of the rings, DMT in which two methyl groups are bonded to the same ring as a fraction boiling at 252° – 254°C., and alkyl benzenes as a fraction boiling at 260° – 270°C.

In the process of the invention the DMT (I) so obtained is dehydrogenated to the original form of type I DMN containing 2,6-DMN. The dehydrogenation reaction can be effected, for example, with the use of a dehydrogenation catalyst such as platinum, palladium, nickel, alumina-chromium or alumina-molybdenum oxide catalyst. It is preferred that the above reaction be effected under an elevated hydrogen pressure in order to inhibit demethylation as a side-reaction and to increase the yields. It is preferred, however, to conduct the reaction at a hydrogen pressure of less than 10 kg/cm$^2$, because if the hydrogen pressure is too high, the dehydrogenation yield will decrease in order to maintain the equilibrium relation. The alumina-chromia catalyst scarcely causes the demethylation reaction and renders it possible to carry out the dehydrogenation reaction in a hydrogen flow at atmospheric pressure.

The dehydrogenation reaction can be conducted at 250° – 450°C. The preferred reaction temperature is 250° – 350°C. with a platinum or palladium catalyst because it has high activity, and 350° – 450°C. with an alumina-chromia catalyst.

Instead of the dehydrogenation reaction isomerization can be induced simultaneously with the dehydrogenation. This process is effective, in particular, where 1,5- and 1,6-isomers are contained in the starting DMN mixture in large amounts and the inclusion of 2,6-isomer is further increased by the isomerization in the case of conversion to the DMT mixture. The dehydroisomerization treatment can be performed according to the same procedure as in the above dehydrogenation reaction, with the exception of using the solid acid catalyst (e.g. silica-alumina catalyst) used in the isomerization of said DMT as supported on the above hydrogenation catalyst. In this case, side-reactions such as demethylation are liable to occur when the activity of the solid acid catalyst is too strong. For this reason, the acid activity is preferably weak.

In the process of the invention the 2,6-DMN is separated and recovered from the dehydrogenation product thus obtained (this terminology also covers the above dehydroisomerization reaction product), and then the residual type I dimethylnaphthalenes are recycled to the partial hydrogenation step. Some operative embodiments of separating and recovering 2,6-DMN from the dehydrogenation product will be shown below.

a. The process in which the 2,6-DMN is precipitated from the above dehydrogenation product by cooling (in accordance with the process the molar ratio of 2,6-DMN to 2,7-DMN in the dehydrogenation product must be at least 0.725, and therefore the process applies to DMN mixtures wherein the ratio is at least 0.725, preferably at least 0.8).

b. A complex of the 2,6-DMN and m-nitrobenzoic acid is formed by bringing the DMN mixture into contact with the m-nitrobenzoic acid. The formation of the complex is performed even at room temperature, and it is also possible to precipitate the complex as crystals by dissolving it in the m-nitrobenzoic acid at elevated temperatures and then cooling. The separation of the 2,6-DMN from the complex is carried out by virtue of various methods such as blowing of steam into the complex, heating or blowing an inert gas into the complex under heating, or dissolving the m-nitrobenzoic acid in an alkaline aqueous solution. Further, the 2,6-DMN may be separated from the complex by washing the complex at an elevated temperature with a hydrocarbon (e.g. heptane) which sparingly dissolves m-nitrobenzoic acid but dissolves the DMN.

The end 2,6-DMN thus recovered can be further purified, if desired, by, for example, a molting recrystallization process or recrystallization process with methanol or other proper solvents.

The residual DMN mixture resulting after separation of 2,6-DMN is recycled to the above partial hydrogenation step.

After, if desired, removing impurities which might impede the recycling step, e.g. m-nitrobenzoic acid used for separation.

Figure 1:
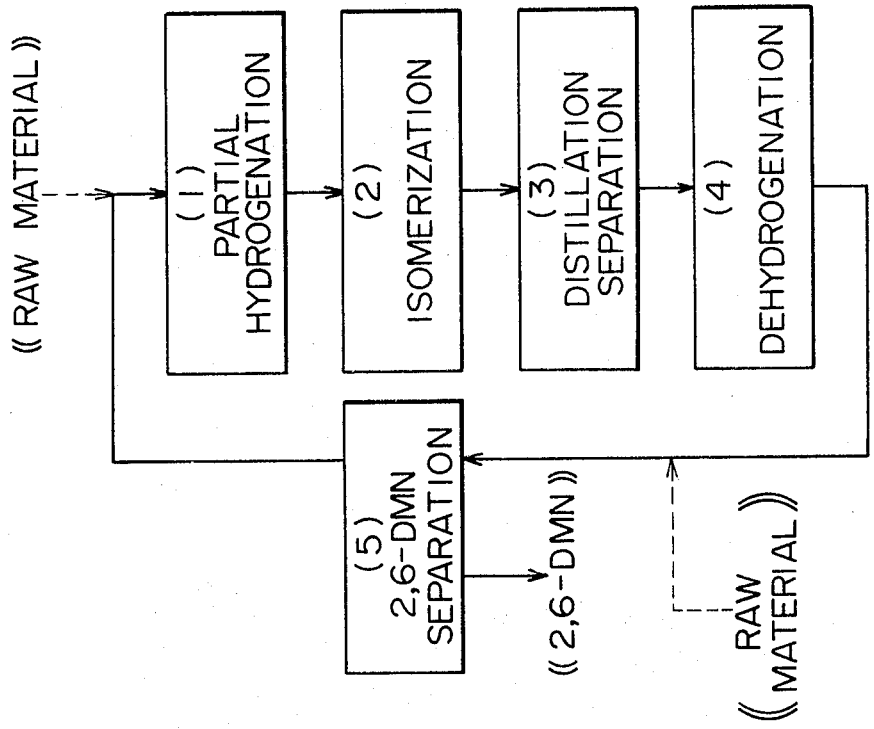

As a typical embodiment of the present process there can be given a flow chart shown in FIG. 1 or FIG. 2. In FIG. 1 numeral (1) shows the partial hydrogenation process wherein the DMN mixture is converted to DMT in selectivity of above 98%. The resulting mixture containing DMT is fed to the isomerization step (2) and isomerized. Then the isomerization product is supplied to the distillation step (3) and separated into the above dimethyltetralins (I), dimethyltetralins (II) and alkylbenzenes.

The fraction of dimethyltetralins (I) is subsequently dehydrogenated to the DMN in the dehydrogenation process (4), and said DMN is fed to the 2,6-DMN separation process (5), thereby to recover the 2,6-DMN therefrom. The residual DMN is recycled to the process (1). A fresh supply of the raw material can be furnished before step (1) or (5).

FIG. 2 is similar to FIG. 1, with the exception of reversing the order of isomerization step (2) and distillation step (3). The quantity of DMT fed to the isomerization step decreases.

The fresh material may be fed before the step (1) or step (5). It is preferred, however, to choose the former mode of supply where the 2,6-DMN content in the raw material is small and the separation is not efficient, and to select the latter mode of feed if the content is large and 2,6-DMN can be effectively separated.

As mentioned above, in the process of the invention the 2,6-DMN can be efficiently prepared from the 2,7-DMN, 1,7-DMN and 1,8-DMN, etc. while such efficient preparation of the 2,6-DMN is impossible by the conventional known methods, and the quantities of the 2,6-DMN obtained make a sharp increase. A further feature is that since alkylbenzenes having nearly the same boiling point as that of DMN can be easily separated from the DMN the utilitanum value of each of these components will be enhanced.

The present invention will be further described in detail by reference to the following examples. Unless otherwise noted, all percentages mentioned in the examples are calculated by weight.

EXAMPLE 1

The residue (2,6-DMN content : 2.3%) obtained by separating 2,6-DMN from the DMN mixture prepared in the petrochemical industry using m-nitrobenzoic acid was washed with alkali to remove m-nitrobenzoic acid completely, and thereafter the residue washed with water and dried was used as a starting oil.

The starting oil contained 25% of alkylbenzenes and 18% of DMN in which two methyl groups are bonded to the same ring. The remnant (57%) was DMN in which individual one methyl group is linked to each ring.

a. Partial hydrogenation step 500 g of the starting oil was charged to a 2l autoclave and 20g of stabilized nickel was added. Thereafter, the oil was partially hydrogenated by introducing a required amount of hydrogen into the autoclave while maintaining the hydrogen pressure at $10 - 40$ kg/cm$^2$ at $130° - 150°C$. After separation from the catalyst, the reaction product was analyzed. The dimethyldecalin content was 0.4% and the total content of dimethyltetralins and alkylbenzenes, 99.6%. No unreacted substances were recognized.

b. Isomerization step

A stainless steel tube was charged with 100 g of a catalyst molded from a mixture of 50% H-type mordenite with 50% bentonite, and 200g of the partially hydrogenated oil obtained in the above step (a) was fed to it at a rate of 50 g/hr at a temperature of 270° to 310°C. for 4 hours thereby to isomerize the oil.

Distillation of the resulting product afforded 110g of a fraction boiling at 235° – 243°C.

c. Dehydrogenation step 50 g of an alumina-chromia (chromia : 25%) catalyst was charged into a stainless-make reaction tube, and reduced by passing hydrogen therethrough at 350°C. for 20 hours. Then 110 g of the DMT mixture obtained in the above step (b) having a boiling point of 235° – 243°C. at a rate of 30 g/hr at 380°C. Analysis of the resultant product by means of gas chromatography showed that the concentration of 2,6-DMN increased to 17%. The resulting product contained 4% of the unreacted substances and methylnaphthalene.

d. Step of separating 2,6-DMN

To 100g of the above dehydrogenation product 50 g of m-nitrobenzoic acid was added and heat dissolved to form a complex. Thereafter, the com;lex was precipitated by cooling, followed by filtration. The concentration of 2,6-DMN in 70g of the filtrate decreased to 8%. The filtrate is used as a raw materials for the partial hydrogenation step after washed in alkali and dried.

On the other hand, the complex was dissolved in ether and after addition of a 5% sodium hydroxide aqueous solution, the solution was well agitated to decompose the complex. The m-nitrobenzoic acid transferred into the aqueous solution of sodium hydroxide and 2,6-DMN, into the ether layer. After evaporating off the ether, the 2,6-DMN obtained was recrystallized from a methanol solvent to afford 7.5g of 2,6-DMN (purified product).

EXAMPLE 2

The partially hydrogenated oil resulting in the step (a) of Example 1 was isomerized with a silica-alumina catalyst (alumina : 35%) at 320° – 350°C. and at a liquid hourly space velocity (hereinafter simply termed "L.H.S.V") of 5. A fraction boiling at 235° – 245°C. obtained by distilling the product was employed as a raw material for the dehydrogenation step.

The fraction was dehydrogenated with a palladium (1%) — alumina catalyst at 300°C. and at L.H.S.V of 1. The 2,6-DMN content in the product was 20.3% and 2,7-DMN, 20.5%. After cooling the product to 35°C. to precipitate the 2,6-DMN therefrom and filtering it, 6g of crude 2,6-DMN having a purity of 80% was separated. The mother liquor is recycled for use as a raw material for the partial hydrogenation.

EXAMPLE 3

In the same manner as in Example 1, 95g of a fraction boiling at 235° – 245°C. obtained by distillation of the partially hydrogenated starting oil was isomerized with a silica-alumina catalyst (alumina : 50%) at 310° and at L.H.S.V. of 0.6. The isomerization product was dehydroisomerized at 380°C. by using as a catalyst a mixture of 9 parts by weight of an alumina-chromia catalyst (containing 25% chromia) with 1 part by weight of a silica-magnesia catalyst (containing 30% magnesia). The concentration of 2,6-DMN in the resulting dehydrogenation product was 19% and somewhat higher than that in Example 1.

The 2,6-DMN was separated from the above dehydrogenation product according to the procedure of Example 1.

EXAMPLE 4

1,000 parts of a DMN mixture containing 12.3% 2,6-DMN, 14.2% 1,6-DMN, 2.0% 1,5-DMN and 12.3% 2,7-DMN was cooled to 11°C. to crystallize the 2,6-DMN. The crystallized 2,6-DMN was separated and washed with petroleum ether to prepare 40 parts of the 2,6-DMN. The residue was partially hydrogenated by the method shown in Example 1, and the product was isomerized and dehydrogenated. When the DMN product was cooled to 7°C., 35 parts (87.5% of the initially obtained 2,6-DMN) of 2,6-DMN was obtained.

COMPARATIVE EXAMPLE 1

The same residue as obtained in Example 4 by separating 40 parts of 2,6-DMN from 1,000 parts of the DMN mixture was isomerized without partial hydrogenation. The product was cooled to 9°C., and the resulting crystals were separated, followed by washing with petroleum ether to afford 21 parts (corresponding to 52.5% of the initially obtained 2,6-DMN) of 2,6-DMN.

The results thus obtained are shown in Table 1. It will be apparent therefrom that in the process without partial hydrogenation (Comparative Example 1) the ratio of 2,7-DMN to 2,6-DMN becomes great because the isomerization of 2,7-DMN to 2,6-DMN does not occur to any appreciable extent, resulting in the lowering of separation efficiency and also in the reduction of the yields.

Table 1

| | Content (parts) in the isomerization product | | Quantity (parts) of 2,6-DMN cooled and separated | Ratio of the second yield of 2,6-DMN to the first yield |
|---|---|---|---|---|
| | 2,6-DMN | 2,7-DMN | | |
| Ex. 4 | 109 | 109 | 35 | 87.5 |
| Comp. Ex. 1 | 101 | 118 | 21 | 52.5 |

EXAMPLE 5

The same residue as obtained in Example 1 by separating 40 parts of 2,6-DMN was partially hydrogenated as in the step (a) of Example 1, and the resulting product was isomerized according to the step (b) of Example 1. 650 parts of a fraction boiling at 235° – 250°C. which was obtained by distillation of the isomerization product was dehydrogenated to form a DMN mixture. By separating the crystals from the resulting mixture at 25°C. and washing them with petroleum ether, 35 parts of 2,6-DMN was prepared.

COMPARATIVE EXAMPLE 2

A Ca-substituted Y-type zeolite catalyst was used for the purpose of isomerizing 2,7-DMN to 2,6-DMN using the same residue as prepared in Example 5. The reaction was conducted at 400°C. and at L.H.S.V. of 0.5. In the reaction product the DMN fraction was 44%, the lower boiling point parts (naphthalene and methylnaphthalenes) and monocyclic aromatics, 31.2% and higher boiling parts (mainly trimethylnaphthalene), 24.8%. Distillation of the product gave 500 parts of a DMN fraction boiling at 250° – 270°C. Then the DMN fraction was cooled to 14°C. to separate crystals. The resulting crystals were washed with petroleum ether to prepare 15 parts of 2,6-DMN. The yield corresponds to 37.5% by weight of the 2,6-DMN initially separated.

What is claimed is:

1. A process for separating and recovering 2,6-dimethylnaphthalene from a dimethylnaphthalene mixture containing

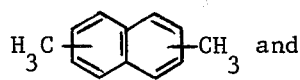 and 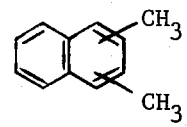

which comprises the steps of:
i. partially hydrogenating the above dimethylnaphthalene mixture to a dimethyltetralin mixture,
ii. subjecting said mixture to an isomerization reaction,
iii. after said isomerization of said dimethyltetralin mixture separating the partially hydrogenated dimethyltetralins (I) of said

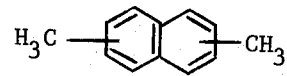

from partially hydrogenated dimethyltetralins (II) of said

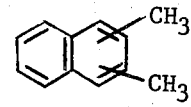

and collecting dimethyltetralins (I),
iv. dehydrogenating said dimethyltetralins (I) to be

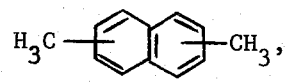

and
v. separating and recovering 2,6-dimethylnaphthalene from the resultant dehydrogenation product and recycling the residual dimethylnaphthalenes to the above partial hydrogenation step (i).

2. The process of claim 1 wherein the partial hydrogenation is carried out at 100°–300°C. and at a hydrogen pressure of 1 – 250 kg/cm² in the presence of at least one catalyst selected from the group consisting of nickel, platinum, palladium, rhodium, copper-chromium, iridium and ruthenium.

3. The process of claim 1 wherein the isomerization reaction is carried out at 150°–450°C. in the presence of at least one catalyst selected from the group consisting of silica-alumina, silica-magnesia, alumina-boria, Y-type zeolite and mordenite.

4. The process of claim 1 wherein the dehydrogenation reaction is carried out at 250°–450°C. in the presence of at least one catalyst selected from the group consisting of platinum, palladium, nickel, alumina-chromia and alumina-molybdenum oxide.

5. The process of claim 4 wherein the dehydrogenation reaction is carried out at 350°–450°C. in a hydrogen stream at an absolute pressure of not more than 10 kg/cm² in the presence of an alumina-chromia catalyst.

6. The process of claim 1 wherein the 2,6-dimethylnaphthalene is precipitated by cooling the dehydrogenation product and then separated from the dehydrogenation product.

7. The process of claim 1 wherein said dehydrogenation product is contacted with m-nitrobenzoic acid to form a solid complex of 2,6-dimethylnaphthalene with m-nitrobenzoic acid; and said solid complex is decomposed followed by collecting 2,6-dimethylnaphthalene.

8. A process for separating and recovering 2,6-dimethylnaphthalene from a dimethylnaphthalene mixture containing

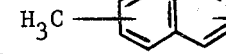 and 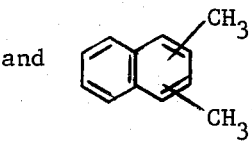

which comprises the steps of:
i. partially hydrogenating the above dimethylnaphthalene mixture to a dimethyltetralin mixture,
ii. separating the partially hydrogenated dimethyltetralins (I) of said

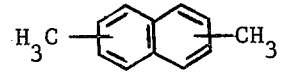

from partially hydrogenated dimethyltetralins (II) of said

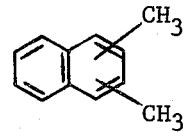

and collecting dimethyltetralins (I),
iii. subjecting said dimethyltetralins (I) to an isomerization reaction,
iv. dehydrogenating said dimethyltetralins (I) to

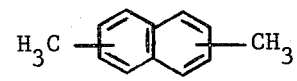

and,
v. separating and recovering 2,6-dimethylnaphthalene from the resultant dehydrogenation product and recycling the residual dimethylnaphthalenes to the above partial hydrogenation step (i).

* * * * *